United States Patent Office 2,771,367
Patented Nov. 20, 1956

2,771,367

STABILIZATION OF ORGANIC COMPOUNDS

Ralph B. Thompson and Ted Symon, Hinsdale, Ill., assignors to Universal Oil Products Company, Des Plaines, Ill., a corporation of Delaware No Drawing. Application November 20, 1953,
Serial No. 393,518

18 Claims. (Cl. 99—163)

This invention relates to the stabilization of organic compounds which tend to deteriorate in storage or in use due to oxidation or other reactions.

The novel method of the present invention may be utilized for the stabilization of various organic materials which are unstable in storage, during the treatment and/or in use, and include motor fuel, jet fuel, diesel oil, mineral oil, lubricating oil, fuel oil, drying oil, greases, waxes, rubber, edible fats and oils, forage crops, monomers including styrene, butadiene, isoprene, acetylenes, etc., various unsaturated alcohols, acids, ketones, etc. These materials are adversely affected by oxygen, with the resultant formation of undesirable gum, discoloration, rancidity or other deleterious reaction products.

The invention is particularly applicable to the stabilization of motor fuel and still more particularly to unsaturated gasolines including cracked gasoline, polymer gasoline, etc. In storage or during transportation and/or treatment these unsaturated gasolines tend to form undesirable gums and/or undergo discoloration.

The invention is also applicable to the treatment of aviation gasolines which tend to undergo deterioration due to the addition of tetraethyl lead fluid or due to other components in the gasoline.

The invention is also particularly applicable to the stabilization of edible and inedible fats and oils, which may be of animal, vegetable or mineral origin and which tend to become rancid, especially during long periods of storage prior to use. Typical representatives of edible fats and oils include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc. It is understood that other oils and fats may be treated within the scope of the present invention, including oils and fats which previously have been subjected to various treatments such as blowing with air, heat treatment, hydrogenation, etc.

In another embodiment the present invention may be applied to the treatment of crops by dusting or spraying in order to preserve food accessory factors such as carotene, vitamins, various fatty acids, alcohols, etc.

In still another embodiment the inhibitor may be incorporated in materials which contact food products including, for example, paraffin wax which is utilized as a coating for containers for food, cardboard or other paper products which are used to package food products, etc.

In one embodiment the present invention relates to a method of stabilizing an organic material against deterioration which comprises incorporating therein an inhibitor comprising an alkoxy-aminonaphthalene.

In a specific embodiment the present invention relates to a method of stabilizing cracked gasoline which comprises incorporating therein from about 0.0001% to about 1% by weight of 1,5-dimethoxy-diaminonaphthalene.

In another specific embodiment the present invention relates to a method of stabilizing a fatty material which comprises incorporating therein from about 0.0001% to about 1% by weight of 1-ethoxy-4-isopropylaminonaphthalene.

As hereinbefore set forth, the novel inhibitor of the present invention comprises an alkoxy-aminonaphthalene. Representative compounds include 1-methoxy-4-aminonaphthalene, 1-ethoxy-4-aminonaphthalene, 1-propoxy-4-aminonaphthalene, 1-butoxy-4-aminonaphthalene, 1-pentoxy-4-aminonaphthalene, 1-hexoxy-4-aminonaphthalene, etc., 1-methoxy-4-methylaminonaphthalene, 1-methoxy-4-ethylaminonaphthalene, 1-methoxy 4-propylaminonaphthalene, 1-methoxy-4-butylaminonaphthalene, 1-methoxy-4-amylaminonaphthalene, 1-methoxy-4-hexylaminonaphthalene, 1-methoxy-4-heptylaminonaphthalene, 1-methoxy-4-octylaminonaphthalene, etc., 1-ethoxy-4-methylaminonaphthalene, 1-ethoxy-4-ethylaminonaphthalene, 1-ethoxy-4-propylaminonaphthalene, 1-ethoxy-4-butylaminonaphthalene, 1-ethoxy-4-amylaminonaphthalene, 1-ethoxy-4-hexylaminonaphthalene, 1-ethoxy-4-heptylaminonaphthalene, 1-ethoxy-4-octylaminonaphthalene, etc., 1-propoxy-4-methylaminonaphthalene, 1-propoxy-4-ethylaminonaphthalene, 1-propoxy - 4 - propylaminonaphthalene, 1 - propoxy-4-butylaminonaphthalene, 1-propoxy-4-amylaminonaphthalene, 1-propoxy - 4 - hexylaminonaphthalene, 1-propoxy-4-heptylaminonaphthalene, 1 - propoxy-4-octylaminonaphthalene, etc., 1-butoxy-4-methylaminonaphthalene, 1-butoxy-4-ethylaminonaphthalene, 1-butoxy-4-propylaminonaphthalene, 1-butoxy - 4 - butylaminonaphthalene, 1 - butoxy - 4 - amylaminonaphthalene, 1 - butoxy-4-hexylaminonaphthalene, 1 - butoxy-4-hepthylaminonaphthalene, 1-butoxy-4-octylaminonaphthalene, etc., 1-pentoxy-4-methylaminonaphthalene, 1-pentoxy-4-ethylaminonaphthalene, 1-pentoxy - 4 - propylaminonaphthalene, 1-pentoxy - 4 - butylaminonaphthalene, 1 - pentoxy-4-amylaminonaphthalene, 1 - pentoxy-4-hexylaminonaphthalene, 1-pentoxy-4-heptylaminonaphthalene, 1 - pentoxy-4-octylaminonaphthalene, etc., 1-hexoxy - 4 - methylaminonaphthalene, 1-hexoxy-4-ethylaminonaphthalene, 1-hexoxy-4-propylaminonaphthalene, 1-hexoxy-4-butylaminonaphthalene, 1-hexoxy - 4 - amylaminonaphthalene, 1-hexoxy-4-hexylaminonaphthalene, 1 - hexoxy-4-heptylamino-naphthalene, 1-hexoxy-4-octylaminonaphthalene, etc. While the 1-alkoxy-4-aminonaphthalenes and 1-alkoxy-4-alkylaminonaphthalenes are preferred, it is understood that the alkoxy and amino group positions may be different and thus include such compounds as 2-alkoxy-3-aminonaphthalenes, 2-alkoxy-3-alkylaminonaphthalenes, 2-alkoxy-4-aminonaphthalenes, 2 - alkoxy-4-alkylaminonaphthalenes, 2-alkoxy-5-aminonaphthalenes, 2-alkoxy-5-alkylaminonaphthalenes, 2 - alkoxy - 6 - aminonaphthalenes, 2-alkoxy-6-alkylaminonaphthalenes, 2-alkoxy-7-aminonaphthalenes, 2-alkoxy-7-alkylaminonaphthalenes, 2 - alkoxy-8-aminonaphthalenes, 2 - alkoxy - 8 - alkylaminonaphthalenes, 2-alkoxy-1-aminonaphthalenes, 2-alkoxy - 1 - alkylaminonaphthalenes, 7-alkoxy - 1 - aminonaphthalenes, 7-alkoxy-1-alkylaminonaphthalenes, etc. The alkoxy group may be selected from methoxy through hexoxy and higher, while the alkylamino group may be selected from methylamino through octylamino and higher.

The compounds specifically hereinbefore set forth include those containing one alkoxy and one amino substituent. The following compounds include those containing two alkoxy and one amino substituents: 1,2-dialkoxy-4 - aminonaphthalene, 1,3-dialkoxy-4-aminonaphthalene, 1,5-dialkoxy-4-aminonaphthalene, 1,6-dialkoxy-4-aminonaphthalene, 1,7-dialkoxy-4-aminonaphthalene, 1,8-dialkoxy - 4 - aminonaphthalene, 1,2-dialkoxy-5-aminonaphthalene, 1,3-dialkoxy-5-aminonaphthalene, 1,5-dialkoxy-3-aminonaphthalene, 1,5-dialkoxy - 7 - aminonaphthalene, etc. Other compounds comprise those having the configuration hereinbefore set forth but having an alkylamino group. The alkoxy and alkylamino groups may be selected from those hereinbefore set forth.

In still another embodiment the inhibitor compound may contain one alkoxy and two amino or alkylamino groups. Representative compounds in this class include 1 - alkoxy-4,5-diaminonaphthalene, 1-alkoxy-4,5-dialkylaminonaphthalene, 1-alkoxy-2,7-diaminonaphthalene, 1-alkoxy - 2,7 - dialkylaminonaphthalene, 1 - alkoxy - 3,6-diaminonaphthalene, 1-alkoxy-3,6-dialkylaminonaphthalene, etc., the alkoxy and alkylamino groups being selected from those hereinbefore set forth.

Still other compounds include those containing two alkoxy and two amino or alkylamino groups. Here again it is understood that the alkoxy and alkylamino group may be selected from those hereinbefore specifically set forth. Representative compounds in this class include 1,5 - dialkoxy-2,7-diaminonaphthalenes, 1,5-dialkoxy-2,7-dialkylaminonaphthalene, 1,5-dialkoxy-4,8-diaminonaphthalene, 1,4-dialkoxy-5,8-diaminonaphthalenes, 1,4-dialkoxy - 5,8 - dialkylaminonaphthalene, 1,6-dialkoxy-3,7-diaminonaphthalenes, 1,6 - dialkoxy-3,7-dialkylaminonaphthalenes, etc.

While the alkylamino derivatives generally are preferred, it is understood that one or both of the amino hydrogens may be substituted by other radicals, including cycloalkyl, cycloalkalkyl, alkcycloalkyl, aryl, alkaryl, aralkyl, alkenyl, etc. Specific compounds having a cycloalkyl radical include, for example, 1-methoxy-4-cyclohexylaminonaphthalene, 1-ethoxy - 4 - methylcyclohexylaminonaphthalene, 1,8-dimethoxy-4,5-dicyclohexylmethylaminonaphthalene, etc. Specific compounds containing an aryl substituent include 1-methoxy-4-phenylaminonaphthalene, 1-ethoxy - 4 - tolylaminonaphthalene, 1,8-dimethoxy-4,5-dibenzylaminonaphthalene, etc.

In some cases the alkoxy-aminonaphthalene may contain one or more hydrocarbon or other substituents attached to the ring. The substituents preferably comprise alkyl groups. In other cases the hydrocarbon group may contain oxygen, nitrogen and/or sulfur attached thereto. In some cases it is of advantage to utilize a mixture of the alkoxyamino compounds. This is of particular advantage because it permits the use of mixtures inherently formed during the preparation of these compounds and thereby avoids the expense of separating the isomers. In general it is preferred that the alkyl groups, when employed, are branched chain and thus includes iso, secondary and/or tertiary branching. Similarly, it generally is preferred that the alkoxy group contains not more than about 6 carbon atoms per group and that the alkyl group contains not more than about 8 carbon atoms per group.

It is apparent that numerous groups may be prepared and utilized in accordance with the present invention. However, all these compounds are not necessarily equivalent and may be of different effectiveness in different substrates.

The inhibitor compound of the present invention generally is incorporated in the organic material to be stabilized in an amount of below about 1% by weight and preferably in an amount within the range of from about 0.0001% to about 1% by weight. When used in gasoline, it is understood that the inhibitor compound may be utilized along with various dyes, synergists, metal deactivators, antiknock agents, such as tetraethyl lead, iron carbonyl, etc., rust inhibitors, etc. When used in edible fats and oils, the inhibitor compound may be used in conjunction with synergist such as citric acid, phosphoric acid, ascorbic acid, etc. and/or in combination with other inhibitors and other compounds added for specific purposes. The inhibitors may be utilized as such or in a suitable solvent including hydrocarbons, alcohols, glycols, ethers, ketones, etc. When desired the inhibitor compound may be marketed as a solution along with other additives to be incorporated in the organic material.

The following examples are introduced to illustrate further the novelty and utility of the present invention but not with the intention of unduly limiting the same.

*Example I*

The gasoline utilized in this example had a blank induction period of 40 minutes. 0.05% by weight of 1-ethoxy-4-aminonaphthalene was incorporated in a sample of the gasoline and this served to increase the induction period thereof to about 675 minutes.

*Example II*

0.05% by weight of 1-ethoxy-4-isopropylaminonaphthalene was incorporated in another sample of the gasoline described in Example I and served to increase the induction period thereof to about 555 minutes.

*Example III*

The gasoline used in this example was a reformed naphtha having a blank induction period of 140 minutes. The inhibitor compound comprised 1,5-dimethoxy-diaminonaphthalene, the exact positions of the amino groups not having been established. 0.02% by weight of this inhibitor served to increase the induction period of the gasoline to 710 minutes.

*Example IV*

The inhibitor compound of this example comprised 1,5-dimethoxy-diisopropylaminonaphthalene. 0.02% by weight of this compound served to increase the induction period of another sample of the gasoline described in Example III to about 780 minutes.

*Example V*

The inhibitor compound of this example comprised 1,5-dimethoxy-aminonaphthalene. The exact position of the amino group has not been established. 0.02% by weight of this compound served to increase the induction period of another sample of the gasoline described in Example III to about 370 minutes.

*Example VI*

This example illustrates the use of an inhibitor compound of the present invention in the stabilization of lard having a normal stability period of five hours as determined by the Swift test. This test is described in detail in the articles by A. E. King, H. L. Roschen and W. H. Irwin, which appeared in Oil and Soap, vol. X, No. 6, pages 106–109 (1933), and modified as described in the article by R. W. Reimenschneider, J. Turer and R. M. Spec, which appeared in Oil and Soap, pages 169–171, September, 1943. In general, this test comprises bubbing air through a sample of the lard until rancidity is determined organoleptically and by peroxide values. 0.02% by weight of 1-methoxy-4-aminonaphthalene is incorporated in a sample of the lard and this will serve to increase the stability period thereof.

*Example VII*

In the stabilization of rubber, 0.8% by weight of 1,5-diethoxy-dihexylaminonaphthalene is added to the latex resulting from the emulsion polymerization of butadiene and styrene, after which the latex is coagulated and dried. The rubber so produced will be improved as to the retention of color, strength, elasticity, etc.

We claim as our invention:

1. An organic material normally subject to oxidative deterioration containing from about 0.0001% to about 1% by weight of a 1,5-dialkoxy-mono-aminonaphthalene.

2. An organic material normally subject to oxidative deterioration containing from about 0.0001% to about 1% by weight of a 1,5-dialkoxy-diaminonaphthalene.

3. Organic material subject to oxidative deterioration in storage containing, as an additive to retard said deterioration, an antioxidizing amount of an alkoxy-aminonaphthalene containing not more than two alkoxy groups and not more than two amino groups.

4. Organic material subject to oxidative deterioration in storage containing from about 0.0001% to about 1% by weight of a 1-alkoxy-4-aminonaphthalene.

5. Organic material subject to oxidative deterioration in storage containing from about 0.0001% to about 1% by weight of 1-ethoxy-4-aminonaphthalene.

6. Organic material subject to oxidative deterioration in storage containing from about 0.0001% to about 1% by weight of 1-ethoxy-4-isopropylaminonaphthalene.

7. Organic material subject to oxidative deterioration in storage containing from about 0.0001% to about 1% by weight of 1,5-dimethoxy-mono-aminonaphthalene.

8. Organic material subject to oxidative deterioration in storage containing from about 0.0001% to about 1% by weight of 1,5-dimethoxy-diaminonaphthalene.

9. Organic material subject to oxidative deterioration in storage containing from about 0.0001% to about 1% by weight of 1,5-dimethoxy-diisopropylaminonaphthalene.

10. Hydrocarbon subject to oxidative deterioration containing an antioxidizing amount of an alkoxy-aminonaphthalene containing not more than two alkoxy groups and not more than two amino groups.

11. Cracked gasoline subject to oxidative deterioration in storage containing an antioxidizing amount of 1,5-dialkoxy-diaminonaphthalene.

12. Cracked gasoline subject to oxidative deteriorative in storage containing an antioxidizing amount of 1,5-dimethoxy-diisopropyl-aminonaphthalene.

13. Fatty material selected from the group consisting of animal and vegetable fats and oils normally subject to oxidative deterioration containing an antioxidizing amount of an alkoxy-aminonaphthalene containing not more than two alkoxy groups and not more than two amino groups.

14. Lard normally subject to oxidative deterioration in storage containing from about 0.0001% to about 1% by weight of a 1-alkoxy-4-aminonaphthalene.

15. Lard normally subject to oxidative deterioration in storage containing from about 0.0001% to about 1% by weight of a 1,5-dialkoxy-diaminonaphthalene.

16. Styrene subject to oxidative deterioration containing an antioxidizing amount of an alkoxy-aminonaphthalene containing not more than two alkoxy groups and not more than two amino groups.

17. Rubber subject to oxidative deterioration in storage containing an antioxidizing amount of an alkoxy-aminonaphthalene containing not more than two alkoxy groups and not more than two amino groups.

18. Wax subject to oxidative deterioration in storage containing an antioxidizing amount of an alkoxy-aminonaphthalene containing not more than two alkoxy groups and not more than two amino groups.

References Cited in the file of this patent
UNITED STATES PATENTS

| | | |
|---|---|---|
| 2,065,568 | Elley et al. | Dec. 29, 1936 |
| 2,633,425 | Thompson | Mar. 31, 1953 |